US008122942B2

(12) United States Patent
Rutkowski et al.

(10) Patent No.: US 8,122,942 B2
(45) Date of Patent: *Feb. 28, 2012

(54) CASTING PROCESSES AND YTTRIA-CONTAINING FACECOAT MATERIAL THEREFOR

(75) Inventors: Stephen Francis Rutkowski, Duanesburg, NY (US); Lawrence Bernard Kool, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 12/474,392

(22) Filed: May 29, 2009

(65) Prior Publication Data

US 2010/0300640 A1 Dec. 2, 2010

(51) Int. Cl.
B22C 9/04 (2006.01)
B22D 27/04 (2006.01)
(52) U.S. Cl. ...... 164/518; 164/516; 164/519; 164/122.1
(58) Field of Classification Search .......... 164/516–519, 164/122.1
See application file for complete search history.

(56) References Cited

U.S. PATENT DOCUMENTS

| 4,703,806 | A | 11/1987 | Lassow et al. |
| 4,904,411 | A * | 2/1990 | Novich et al. ............ 516/33 |
| 5,047,181 | A * | 9/1991 | Occhionero et al. ......... 264/28 |
| 5,205,971 | A | 4/1993 | Croft et al. |
| 5,221,336 | A | 6/1993 | Horton |
| 5,464,797 | A | 11/1995 | Yasrebi et al. |
| 5,643,844 | A | 7/1997 | Yasrebi et al. |
| 6,237,671 | B1 | 5/2001 | Lassow et al. |
| 2006/0102052 | A1* | 5/2006 | Doles ........................ 106/634 |
| 2006/0130996 | A1 | 6/2006 | Bewlay et al. |
| 2008/0119347 | A1 | 5/2008 | Sturgis et al. |
| 2009/0032994 | A1 | 2/2009 | Ema et al. |

FOREIGN PATENT DOCUMENTS

WO WO2008013826 11/2008

OTHER PUBLICATIONS

GB1008670.0 Search Report Sep. 28, 2010.

* cited by examiner

Primary Examiner — Kuang Lin
(74) Attorney, Agent, or Firm — Scott J. Asmus

(57) ABSTRACT

A slurry suitable for forming facecoats, facecoats formed by such a slurry, and processes using such facecoats. The slurry is formed of a particulate refractory material, an aqueous suspension containing a particulate inorganic binder, a thixotropic organic binder, a dispersant, and possibly optional constituents excluding particulate refractory materials and inorganic binders. The particulate refractory material constitutes at least about 60 weight percent of the slurry and consists essentially of yttria. The aqueous suspension containing the particulate inorganic binder constitutes at most about 35 weight percent of the facecoat slurry. The dispersant is present in the slurry in an amount sufficient to stabilize the slurry at a pH of up to about 10, and has the general formula $H_x[N(CH_2)_yOH]_z$, where x has a value of 0, 1 or 2, y has a value of 1 to 8, and z=3−x.

6 Claims, 2 Drawing Sheets

CASTING PROCESSES AND YTTRIA-CONTAINING FACECOAT MATERIAL THEREFOR

BACKGROUND OF THE INVENTION

This invention generally relates to casting processes and materials. More particularly, the invention relates to materials and processes suitable for use in melting and casting operations, including the melting and casting of reactive materials.

While nickel-, cobalt- and iron-based superalloys have found wide use for components within gas turbine engines, especially for use in the hot gas path of these engines, alternative materials have been used and proposed to achieve various desired properties, including lower densities and higher temperature capabilities. Nonlimiting examples include reactive metals and their alloys (notable examples of which include niobium, titanium, zirconium, and their respective alloys), refractory metal intermetallic composite (RMIC) materials (notable examples of which include alloys based on niobium, titanium, hafnium and zirconium), and nickel-, cobalt-, and iron-base superalloys containing relatively high levels of reactive elements. In addition to the previously-noted reactive metals, other notable reactive elements include yttrium, cerium, cesium, tantalum, tungsten, rhenium and potentially other elements that tend to readily react with oxygen when molten or at an elevated temperature.

Components formed of reactive element-based materials are often formed by casting techniques, a notable example being investment casting (lost wax) processes. As known in the art, investment casting typically entails dipping a wax or plastic model or pattern of the desired component into a slurry comprising a binder and a refractory particulate material to form a slurry layer on the pattern. Common materials for the refractory particulate material include alumina, silica, zircon and zirconia, and common materials for the binder include silica-based materials, for example, colloidal silica. A stucco coating of a coarser refractory particulate material is typically applied to the surface of the slurry layer, after which the slurry/stucco coating is dried. The preceding steps may be repeated any number of times to form a shell mold of suitable thickness around the wax pattern. The wax pattern can then be eliminated from the shell mold, such as by heating, after which the mold is fired to sinter the refractory particulate materials and achieve a suitable strength. To produce hollow components, such as turbine blades and vanes having intricate air-cooling channels, one or more cores are positioned within the shell mold to define the cooling channels and any other required internal features. Cores are typically made by baking or firing a plasticized ceramic mixture. One or more cores are then positioned within a pattern die cavity into which a wax, plastic or other suitably low-melting material is introduced to form the pattern. The pattern with its internal cores can then be used to form a shell mold as described above. Once the shell mold is completed and the pattern selectively removed to leave the shell mold and cores, molten metal is introduced into the shell mold and solidified to form the desired component, after which the mold and cores are removed.

Shell molds and cores used in investment casting processes must exhibit sufficient strength and integrity to survive the casting process. Additional challenges are encountered when attempting to form castings of reactive materials as a result of their high melting temperatures and reactivity, which have presented significant barriers to the use of conventional ceramic molds. For this reason, surfaces of molds and cores used in the casting of reactive materials are often provided with protective barriers known as facecoats. Facecoats are generally applied to mold and core surfaces in the form of a slurry, which may be dried and sintered prior to the casting operation or may undergo sintering during the casting operation. Typical facecoat slurries comprise a refractory particulate material in an aqueous-based inorganic binder, optionally with various additional constituents such as organic binders, surfactants, dispersants, pH adjusters, etc., to promote the processing, handling, and flow characteristics of the slurry. The refractory particulate material is chosen on the basis of being sufficiently unreactive or inert to the particular reactive material being cast. Various facecoat materials have been used and proposed, including those containing yttria ($Y_2O_3$), alumina ($Al_2O_3$), and zirconia ($ZrO_2$) in a colloidal silica binder.

Yttria-containing facecoats have been particularly identified for use due to their relative inertness to reactive materials. However, a significant drawback is that conventional slurries suitable for producing yttria-containing facecoats exhibit a poor shelf life under typical mold room conditions. In particular, yttria-based slurries are prone to gelling, leading to poor application characteristics as well as casting surface defects. As a result, if not used within a relatively short time a yttria-based slurry must typically be discarded. Various solutions have been proposed to address the instability of yttria-based facecoat slurries, including control of the slurry pH (for example, above 10.2), fusing yttria with other oxides, and protecting the slurry from contact with air. While effective, less complicated and costly measures would be desirable.

BRIEF DESCRIPTION OF THE INVENTION

The present invention provides slurries suitable for forming facecoats, facecoats formed by such slurries, and processes using such facecoats. The composition of the facecoat is particularly well-suited for use in melting and casting reactive materials.

According to one aspect of the invention, an aqueous-based facecoat slurry is formed of a particulate refractory material, an aqueous suspension containing a particulate inorganic binder, a thixotropic organic binder, a dispersant, and possibly optional constituents excluding particulate refractory materials and inorganic binders. The particulate refractory material contains yttria and constitutes at least about 60 weight percent of the facecoat slurry. The aqueous suspension containing the particulate inorganic binder constitutes at most about 35 weight percent of the facecoat slurry. For certain facecoat applications the facecoat slurry more preferably contains about 1 to about 5 weight percent of the aqueous suspension containing the particulate inorganic binder, while for certain other facecoat applications the facecoat slurry more preferably contains about 15 to about 20 weight percent of the aqueous suspension containing the particulate inorganic binder. The dispersant is present in the slurry in an amount sufficient to stabilize the slurry at a pH of up to about 10, and has the general formula $H_x[N(CH_2)_yOH]_z$, where x has a value of 0, 1 or 2, y has a value of 1 to 8, and z=3−x. The slurry may further contain optional constituents, none of which may be a particulate refractory material or an inorganic binder.

Another aspect of the invention are facecoats formed by firing the aqueous-based facecoat slurry described above. During the firing process, water, the thixotropic organic binder, the dispersant, and the optional constituents (if present) are removed from the slurry, and the particulate refractory and inorganic materials are sintered. After firing, the facecoat comprises at least 60 weight percent of a first phase formed by the particulate refractory material, and the balance of the facecoat is essentially a binder phase formed by the particulate inorganic binder.

According to yet another aspect of the invention, a process is provided for casting a component. The process entails applying an aqueous-based facecoat slurry to a surface within a cavity to form a facecoat on the surface. The slurry is made up of a particulate refractory material, an aqueous suspension containing a particulate inorganic binder, a thixotropic organic binder, a dispersant, and possibly optional constituents excluding particulate refractory materials and inorganic binders. The particulate refractory material contains yttria and constitutes at least about 60 weight percent of the facecoat slurry. The aqueous suspension containing the particulate inorganic binder constitutes at most about 35 weight percent of the facecoat slurry. The dispersant is present in the slurry in an amount sufficient to stabilize the slurry at a pH of up to about 10, and has the general formula $H_x[N(CH_2)_yOH]_z$, where x has a value of 0, 1 or 2, y has a value of 1 to 8, and z=3−x. The facecoat is then contacted by a molten reactive material, such as a result of melting a reactive material within the cavity or introducing a molten quantity of a reactive material into the cavity. Optionally, the molten quantity can be allowed to cool and solidify to form a component formed of the reactive material, in which case the facecoat is then removed from the component.

Reactive materials for which this invention is particularly advantageous include metallic alloys and RMIC materials containing niobium and titanium, though alloys and materials containing other reactive elements are also encompassed by this invention. A notable advantage of the invention is that, in addition to producing a facecoat capable of reducing reactions between a reactive material and a mold, core, or crucible used in the course of a casting operation, the facecoat slurry exhibits a long shelf life due to improved stability. Other advantages include a high solids loading for achieving desirable casting surface finishes, relatively low viscosities for achieving desirable mixing properties, and strength and relatively low porosity to provide a reliable protective barrier between the molten reactive material and the mold or core. Notably, this combination of properties is believed to be attributable in large part to the particular dispersant used in the slurry, which enables the slurry and facecoat to achieve these preferred aspects of the invention without resorting to maintaining a pH above 10.2, fusing yttria with other oxides, protecting the slurry from contact with air, and other additional measures prescribed in the past. Instead, these aspects are achieved by narrowly tailoring the composition of the slurry while allowing for the use of relatively uncomplicated and low-cost materials and processes.

Other aspects and advantages of this invention will be better appreciated from the following detailed description.

DETAILED DESCRIPTION OF THE INVENTION

Figure 1:
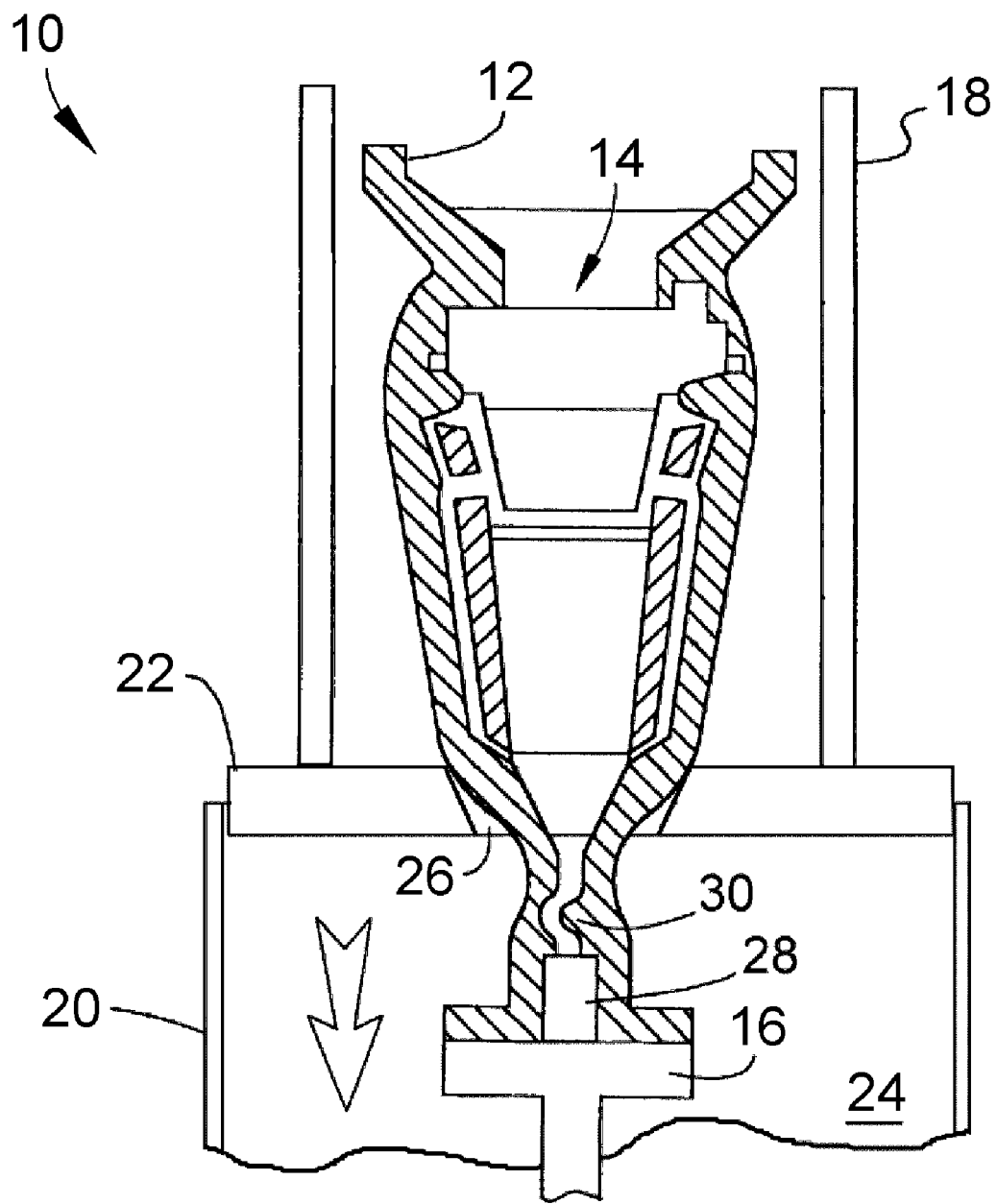
FIG. 1 represents a cross-sectional view of a casting apparatus.

FIG. 1 schematically represents a casting apparatus 10 that can be used with the present invention. The apparatus 10 and its following description are merely intended as a nonlimiting representation that shows a shell mold 12 suitable for use in the casting of molten materials by investment casting processes. Furthermore, the invention will be described in reference to a facecoat slurry 32 (FIG. 2) and facecoat 36 (FIG. 3) intended to protect the mold 12. However, it will become evident that the slurry 32 and facecoat 36 is also useful as coatings on a core placed in the mold 12, as well as crucibles used to melt materials prior to their introduction into the mold 12.

As known in the art, the mold 12 is preferably formed of a refractory material such as alumina, silica, etc., and defines an internal mold cavity 14 having the desired shape of the casting, for example, a turbine blade or bucket. As known in the art of investment casting, the cavity 14 can be defined through the use of a wax pattern (not shown) whose shape corresponds to the desired shape of the casting. The pattern is removed from the shell mold 12 prior to the casting operation, such as with conventional techniques including flash-dewaxing, microwave heating, autoclaving, and heating in a conventional oven. The cavity 14 may contain one or more cores (not shown) for the purpose of forming internal cavities or passages within the casting.

The mold 12 is shown secured to a chill plate 16 and placed in a heating zone 18 (for example, a Bridgman furnace) to heat the mold 12 to a temperature equal to or above the melting temperature of the casting material, which in the present invention may be a reactive material though the casting of other materials is also within the scope of the invention. The apparatus 10 is shown as equipped for unidirectional solidification of the casting, though this capability is also not a requirement or limitation of the invention. For the purpose of unidirectional solidification, a cooling zone 20 is represented as being located directly beneath the heating zone 18, and a baffle or heat shield 22 is represented as being between and separating the heating and cooling zones 18 and 20. The cooling zone 20 may be a tank containing a liquid cooling bath 24, such as a molten metal. Other alternatives are for the cooling zone 20 to employ a radiation cooling tank that may be evacuated or contain a gas at ambient or reduced temperatures, gas impingement cooling (for example, see U.S. Pat. No. 7,017,646 to Balliel et al.) or a fluidized bed (for example, see U.S. Pat. No. 6,443,213). Particularly suitable liquids for the liquid cooling bath 24 include molten tin at a temperature of about 235 to about 35° C. and molten aluminum at a temperature of up to about 70° C., with molten tin believed to be especially suitable because of its low melting temperature and low vapor pressure. The heat shield 22 insulates the cooling zone 20 from the heating zone 18 to promote a steep thermal gradient between the mold 12 and cooling bath 24. The heat shield 22 preferably has a variable-sized opening 26 that enables the shield 22 to fit closely around the shape of the mold 12 as it is withdrawn from the heating zone 18, through the heat shield 22, and into the liquid cooling bath 24.

The casting process is preferably carried out in a vacuum or an inert atmosphere, with the mold 12 preheated to a temperature above the reactive material's melting (liquidus) temperature, as nonlimiting examples, about 1470° C. or more for titanium or one of its alloys and about 1700° C. or more for niobium or one of its alloys. The molten alloy is poured into the preheated mold 12 after which, in accordance with conventional practices for unidirectional solidification, the base of the mold 12 and chill plate 16 are withdrawn downwardly at a fixed withdrawal rate into the cooling zone 20 until the mold 12 is entirely within the cooling zone 20. The temperature of the chill plate 16 is preferably maintained at or near the temperature of the cooling zone 20, such that dendritic growth begins at the lower end of the mold 12 and the solidification front travels upward through the mold 12. The casting can be caused to grow epitaxially based on the crystalline structure and orientation of a small block of single-crystal seed material 28 at the base of the mold 12, from which a single crystal forms from a crystal selector 30, for example, a pigtail sorting structure. The columnar single crystal becomes larger in the enlarged section of the cavity 14.

Figure 2:
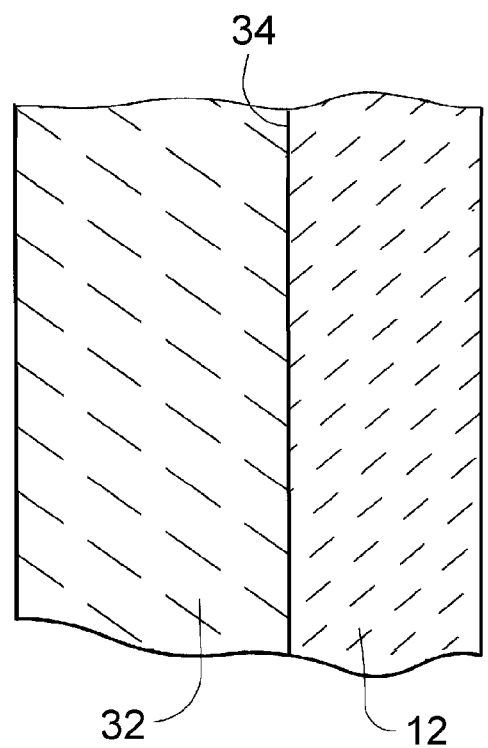
FIG. 2 represents a fragmentary cross-sectional view of a mold assembly of FIG. 1 and shows a facecoat slurry applied to an interior mold cavity surface in accordance with an embodiment of the invention.

FIG. 2 represents a fragment of a wall section of the mold 12 of FIG. 1. As noted above in reference to FIG. 1, a preferred aspect of the invention is the ability of the mold 12 to be used in the casting of reactive materials, nonlimiting but notable examples of which include niobium, titanium, and zirconium-based alloys, and materials or alloys that contain relatively high levels of these metals or another reactive element. Various processes are possible for fabricating the mold 12 that are within the scope of this invention. The mold 12 can be fabricated from conventional shell mold materials, such as alumina or silica as noted above, which are prone to react with many reactive materials at temperatures required for a casting operation. For this reason, the mold 12 is presented in FIG. 2 as having a layer of a facecoat slurry 32 applied to its interior surface 34, which is then heated and sintered to form a solid facecoat 36 shown in FIG. 3. Various techniques can be employed to apply the slurry 32 to the mold 12, nonlimiting examples of which include dipping, molding, spraying, etc. Though not shown, it should be understood that a core placed in the mold cavity 14 would likely also be provided with a layer of the same or similar slurry to form a facecoat.

Figure 3:
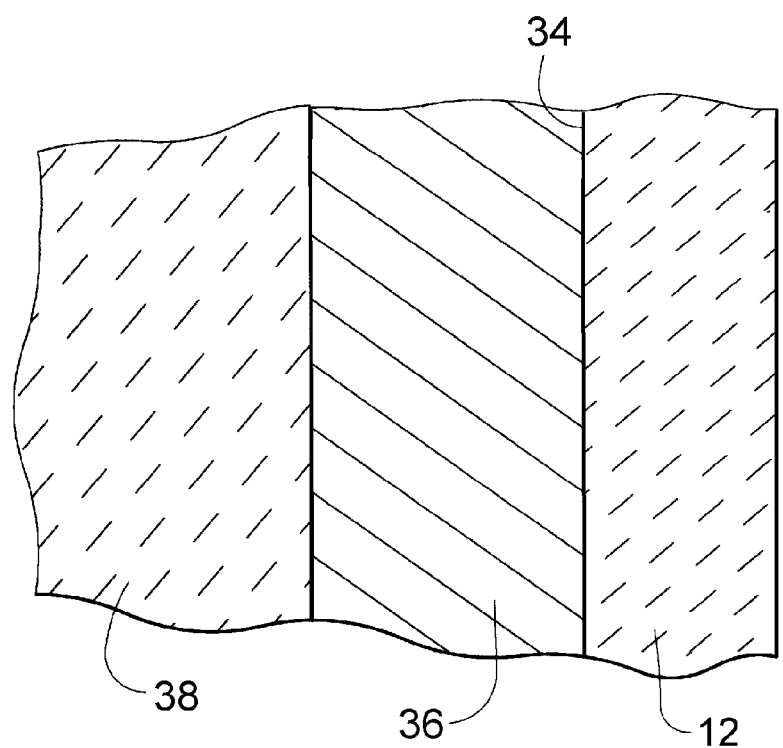
FIG. 3 represents a fragmentary cross-sectional view of the mold assembly of FIG. 2 and shows a molten reactive material contacting a facecoat formed by the slurry of FIG. 2.

FIG. 3 schematically represents the appearance of the mold 12 and facecoat 36 following the introduction and solidification of a reactive material within the shell mold cavity 14 to form a casting 38. Because the shell mold 12 and its facecoat 36 can be used in substantially conventional investment casting processes as well as other types of casting processes, the casting process itself will not be discussed in any further detail.

The facecoat 36 is a ceramic composition that contains yttria ($Y_2O_3$) and a minimal amount of an inorganic binder, such that the facecoat 36 has a refractory phase in an inorganic binder phase. The yttria refractory phase is the dominant phase of the facecoat 36 and constitutes at least 60 weight percent of the facecoat 36. The composition of the facecoat 36 is predominantly or entirely the refractory and binder phases. The shell mold 12 may also be formed of the same or similar composition used to form the facecoat 36, though traditional mold compositions can be used.

As is generally conventional in the fabrication of facecoats for casting processes, the slurry 32 of FIG. 2 used to form the facecoat 36 of FIG. 3 contains a refractory powder mixed with binders and other ingredients intended to confer desirable properties to the slurry 32. The refractory powder is preferably formed entirely of yttria particles (and likely impurities), and therefore is not intentionally a mixture of yttria with other oxides or ceramic materials. However, the presence of other oxides or ceramic materials is permissible, nonlimiting examples of which include alumina, zircon, zirconia, calcia, magnesia, and rare earth oxides. A suitable particle size for the yttria particles is up to about 44 micrometers, more preferably about 5 to about 40 micrometers. The refractory powder constitutes at least 60 weight percent of the slurry 32, more preferably about 82 to about 88 weight percent of the slurry 32, with a suitable nominal content being about 85 weight percent, resulting in the slurry 32 having what will be termed a high-solids loading.

The slurry 32 is formed by combining the refractory powder with a particulate inorganic binder in an aqueous suspension, a thixotropic organic binder, a dispersant, and possibly optional constituents excluding particulate refractory materials and inorganic binders. The aqueous suspension containing the particulate inorganic binder preferably does not constitute more than 35 weight percent of the slurry 32. Preferred amounts of the aqueous suspension depend on the particular application for the facecoat 36. For facecoat applications such as the shell mold 12 used in the casting of reactive materials, the facecoat slurry preferably contains up to about 5 weight percent of the aqueous suspension containing the particulate inorganic binder. More preferably, the aqueous suspension constitutes about 1 to about 5 weight percent of the slurry 32, with a suitable nominal content being about 2.5 weight percent. In other facecoat applications, such as crucibles for melting reactive materials, the facecoat slurry more preferably contains about 15 to about 20 weight percent of the aqueous suspension containing the particulate inorganic binder. These minimal amounts of the particulate inorganic binder in the slurry 32 reduce the likelihood of potential reactions between the inorganic binder and the molten reactive material placed in the mold 12. A preferred inorganic binder is believed to be colloidal silica, though other inorganic binders could be used. The aqueous suspension preferably contains about 15 to about 40 weight percent solids, more preferably about 20 to about 30 weight percent solids, with a suitable nominal content being about 30 weight percent solids. The balance of the aqueous suspension is preferably entirely water. A typical particle size for the particulate inorganic binder is generally about 14 nanometers and less. A commercial example of a suitable colloidal silica is Remasol® LP-30, available from Remet.

While additional additives, such as organic binders, surfactants, dispersants, defoaming agents, pH adjusters, etc., are known in the art as useful in facecoat slurries, slurry compositions preferred by the present invention selectively utilize certain additives in certain amounts that have been determined with this invention to compensate for the very high solids content and low inorganic binder content of the slurry 32, as described above. In particular, the slurry 32 is formulated to contain a dispersant whose composition is chosen in part on the basis of being capable of stabilizing the pH of the slurry 32 and maintaining the pH within a suitable range, preferably up to a pH of about 10 with a particular preferred example being a pH of 8.6 to 10.1. Dispersants believed to be suitable for use in the slurry 32 of this invention have the general formula $H_x[N(CH_2)_yOH]_z$, where x has a value of 0 (tertiary amines), 1 (secondary amines) or 2 (primary amines), y has a value of 1 to 8, and z=3−x. A preferred dispersant is believed to be triethanol amine ($N[(CH_2)_2OH]_3$), which is believed to have properties important to the slurry 32. First, triethanol amine is weakly basic and therefore capable of raising the pH of the slurry 32. Second, triethanol amine contains three alcohol functionalities that give it dispersant properties. Other compounds having the general formula $H_x[N(CH_2)_yOH]_z$ that could be used in the slurry 32 include monoethanol amine, diethanol amine, monopropanol amine, dipropanol amine, tripropanol amine. The dispersant constitutes at least 1 up to about 10 weight percent of the slurry 32, more preferably about 1 to about 5 weight percent of the slurry 32, with a suitable nominal content of about 2 weight percent. A commercial example of a suitable dispersant is Alfa Aesar® 22947 available from Alfa Aesar.

The slurry 32 is further formulated to contain a thixotropic organic binder that helps maintain the high solids loading of the slurry 32, while also promoting a smooth surface finish for the facecoat 36 and reducing the viscosity of the slurry 32, especially during mixing. The term thixotropic is used according to its ordinary meaning to denote certain materials whose viscosities change greatly with changes in shear (velocity). Preferred thixotropic organic binders also allow for lower mixing speeds, which are believed to promote the shelf life of the slurry 32 by reducing slurry friction and temperature during mixing. The thixotropic nature of the organic binder also allows the viscosity of the slurry 32 to be modified during mixing by adjusting the mixing speed. Thixotropic organic binders of particular interest to the invention include styrene-butadiene polymer dispersions particular suitable for use with colloidal silica binders. The organic binder constitutes at least 0.3 up to about 0.9 weight percent of the slurry 32, more preferably about 0.6 to about 0.7 weight percent of the slurry 32, with a suitable nominal content of about 0.6 weight percent. A commercial example of a suitable thixotropic organic binder is LATRIX® 6305 commercially available from the Ondeo Nalco Company.

The slurry 32 may contain other additives, such as surfactants, defoaming agents, additional organic binders, etc. For example, the slurry 32 may contain a wetting agent, such as NALCO® 8815 ionic wetting agent, and/or a defoamer such as NALCO® 2305 water-based defoamer, both commercially available from the Nalco Company. Notably, however, the slurry 32 preferably does not contain any further particulate constituents that would form any part of a solid phase in the facecoat 36. Instead, the thixotropic organic binder, dispersant, and any additional additives in the slurry 32 are preferably cleanly burned off during drying, heating and/or sintering of the slurry 32 to form the facecoat 36.

The slurry 32 can be prepared by standard techniques using conventional mixing equipment, and then undergo conventional processes to form the facecoat 36 on the mold cavity surface 34, such as by dipping, molding, or another suitable technique. Using these application methods, a suitable viscosity range for the slurry 32 is about five to about seven seconds using a standard #5 Zahn cup measurement. Suitable thicknesses for the slurry layer will depend on various factors, including the particular reactive material, mold material, and slurry composition. In general, the slurry is preferably applied to produce a facecoat 36 having a thickness of at least about 0.3 mm, for example, about 0.3 to about 0.6 mm and more preferably about 0.5 mm to produce a reliable protective barrier for the mold 12. The layer of facecoat slurry 32 is then dried and fired in accordance with well-known practices. The organic binder, dispersant, and other additional additives of the slurry 32 preferably provide an adequate level of green strength to the slurry layer after drying, and then burn off cleanly prior to or during firing, by which the particles of the refractory powder sinter. Drying can be performed at room temperature, which is then preferably followed by a presintering step that entails heating at a rate of about 200° C./hour to a temperature of about 1000° C., a one-hour hold at about 1000° C., and then cooling at a rate of about 200° C./hour to room temperature. This intermediate firing procedure is preferably performed prior to firing at a final sintering temperature for the purpose of eliminating the organic additives within the slurry 32, and can be performed according to conventional techniques, for example, in a gas or electric furnace. Full sintering of the facecoat 36 occurs at around 1600° C., which can occur during the mold preheating step of the casting process. As understood in the art, suitable and preferred temperatures, durations, and heating rates during drying and firing will depend on factors such as slurry thickness, composition, particle size, etc. As such, the drying and firing temperatures and durations can vary significantly.

As a result of firing, the facecoat 36 is in the form of a monolithic low-porosity protective barrier on the cavity surface 34 that protects the mold 12 and prevents reactions between the mold 12 and molten reactive material, thereby reducing the likelihood of defects in the casting 38. In addition, the facecoat 36 also preferably exhibits a desirable level of strength and adhesion to ensure that the facecoat 36 will survive the casting process, which can be a conventional investment casting process as described in reference to FIG. 1.

Investigations leading to the present invention have shown that the high-solids yttria facecoat 36 having compositions as described above can be successfully employed to cast TiAl alloys, which are known to be highly reactive to conventional silica mold materials. The facecoat 36 has also been shown to resist surface reactions with molten tin, which is advantageous for protecting the casting 38 from reactions with a molten tin cooling bath 24 (FIG. 1) in the event the mold 12 cracks or is otherwise infiltrated by molten tin during cooling of the casting 38. Finally, investigations have shown that facecoat slurries 32 having compositions as described above are capable of extended shelf lives of six months or more when stored under typical mold room conditions, including exposure to air at room temperatures.

While the invention has been described in terms of certain embodiments, it is apparent that other forms could be adopted by one skilled in the art. Therefore, the scope of the invention is to be limited only by the following claims.

The invention claimed is:

1. A process comprising:
    applying an aqueous-based facecoat slurry to a surface within a cavity to form a facecoat on the surface, the aqueous-based facecoat slurry consisting of:
        at least 60 weight percent of a particulate refractory material consisting essentially of yttria,
        at most 35 weight percent of an aqueous suspension containing a particulate inorganic binder,
        a thixotropic organic binder,
        a dispersant having the general formula $H_x[N(CH_2)_yOH]_z$, where x has a value of 0, 1 or 2, y has a value of 1 to 8, and z=3-x, the dispersant being present in the slurry in an amount sufficient to stabilize the slurry at a pH of up to about 10, and optionally
        constituents excluding particulate refractory materials and inorganic binders; and
    contacting the facecoat with a molten quantity of a reactive material.

2. The process according to claim 1, wherein the aqueous suspension containing the particulate inorganic binder comprises colloidal silica.

3. The process according to claim 1, wherein the dispersant is chosen from the group consisting of triethanol amine, diethanol amine, monoethanol amine, tripropanol amine, dipropanol amine, and monopropanol amine.

4. The process according to claim 1, wherein the reactive material contains at least one constituent chosen from the group consisting of niobium, titanium, zirconium, hafnium, yttrium, cerium, cesium, tantalum, tungsten and rhenium, and the facecoat is substantially nonreactive with the molten quantity of the reactive material.

5. The process according to claim 1, wherein the process is a casting process, the cavity is within a mold, and the contacting step comprises introducing the molten quantity of the reactive material into the cavity of the mold, the process further comprising:
    allowing the molten quantity to cool and solidify to form a component formed of the reactive material; and then
    removing the mold and the facecoat from the component.

6. The process according to claim 5, wherein the component is a gas turbine engine component.

* * * * *